Nov. 27, 1945.   W. E. SMITH   2,389,938
ELECTRODE HOLDER
Filed April 5, 1944
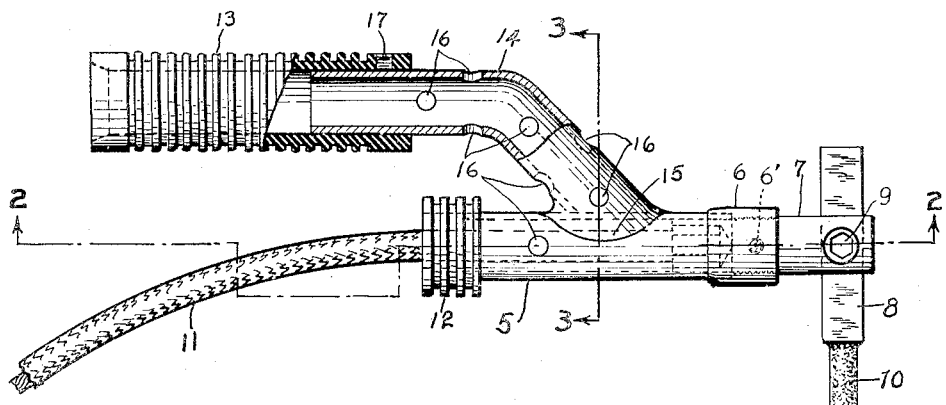
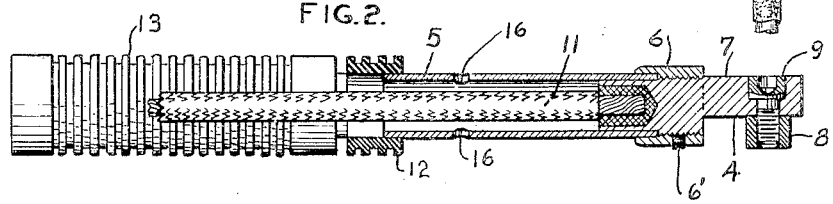
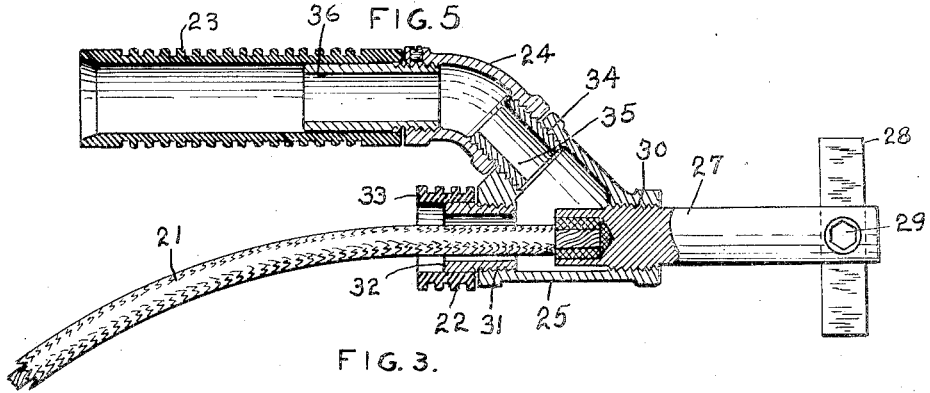
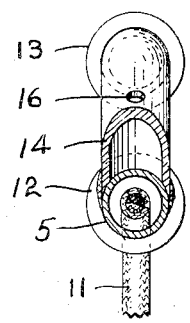
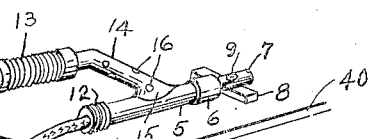
INVENTOR.
WILLIAM E. SMITH
ATTORNEY.

Patented Nov. 27, 1945

2,389,938

UNITED STATES PATENT OFFICE 2,389,938

ELECTRODE HOLDER

William E. Smith, Detroit, Mich., assignor to The Midland Steel Products Company, Cleveland, Ohio, a corporation of Ohio Application April 5, 1944, Serial No. 529,600

9 Claims. (Cl. 219—8)

This invention relates to new and useful improvements in electrode holders and an important object of the invention is to provide a holder with a novel arrangement and construction of handle to preclude its overheating and to facilitate its manipulation.

Another important object of the invention is to provide a holder which is easily constructed of tubing or light gauge standard pipe fittings and couplings, and is provided with an offset handle to establish better balance of the holder when in use to reduce fatigue, as well as to keep the handle cool in any operation.

Other objects and advantages of the invention will become apparent during the course of the following description.

In the accompanying drawing forming a part of the application and wherein like numerals are employed to designate like parts throughout the several views, Fig. 1 is a side elevation of the improved electrode holder, with a portion of the handle broken away to illustrate its construction, Fig. 2 is a longitudinal section through the holder taken on the line 2—2 of Fig. 1, Fig. 3 is a transverse section taken on the line 3—3 of Fig. 1, Fig. 4 is a perspective view of the holder shown lying upon a table top or other support with parts thereof disposed in a relationship causing the handle to be spaced from the table top when so positioned at rest, Fig. 5 is a longitudinal section through a modified form of electrode holder made up principally of standard coupling and pipe fittings.

This electrode holder is made to handle heavy weld rods of the order of ⅜ to ½ inch in diameter, which are usually welded to the holder instead of being clamped thereto by jaws, but it is to be understood that it is capable of use with any kind of electrode clamping or holding means.

The holder is preferably constructed from a straight piece of light gauge tubing 5, having an internally threaded collar 6 secured to one end thereof for the attachment of a conductor head 7 of good electric conducting material. This head is formed from round copper stock with its outer end flattened lengthwise on one side as at 4, to which a piece 8 of rectangular bar stock of good conducting material is adjustably and rigidly secured by an Allen screw 9. By loosening this screw, the piece 8 can be removed and replaced when necessary. To any face of said piece or directly to the head 7, is adapted to be welded the bared end of a coated electrode or weld rod 10. The rectangular conductor piece 8 can be turned on the axis of the screw 9 and be clamped in any desired angular relation to the head by first loosening and then tightening the screw 9.

The inner end of this head 7 is externally threaded to be attached to the collar 6, and has formed axially thereof a socket, in which is brazed or soldered the bared end of a conductor cable 11. This cable extends lengthwise through the tube 5 in spaced relation to the walls thereof and is connected to a suitable transformer or source of current. The inner end of this tube has a non-conducting collar 12 of insulating material pressed thereon to keep the cable from scuffing on the end of the tube. A set screw 6' may be screwed into the collar to bite into the threaded portion of the conductor head 7 to hold the flattened surface 4 of the latter adjusted to any angle about the axis of the body.

A handle for the holder is offset laterally from the tube 5 and extends in a plane parallel therewith. It is formed with an open ended piece of tubing 14 bent or formed between its ends to include an angle of approximately 130°. On one leg of this tube is fastened the hollow handle 13 of non-conducting material by screws 17. The end of the other leg is formed as at 15 to fit and to be brazed to approximately the medial portion of the tube 5. Thus, the outer end of the handle tubing is closed by the wall of the tube 5. The handle tubing 14 is provided with a series of ventilating apertures 16 to assist in aerating and cooling the handle. The handle 13 is thus disposed a distance rearwardly of the cable carrying tube 5 or body of the holder and is entirely free and clear of the cable 11; which arrangement, together with the effect of the cable bearing on the collar 12, especially when supported from above, balances the holder and relieves some exertion or strain from the operator using the holder. The handle 13 and tubing 14 being hollow and blocked off from the cable carrying tube 5, is isolated from hot air in the tube, caused by heating of the cable; and the apertures 16 in the tubing promote the circulation of air in the handle to keep it in a cool state. Overheating of the handle is also assured by the fact that it is supported entirely free and clear of the conductor cable 11 which increases in temperature during welding operations.

The modified form of holder shown in Fig. 4 has the same essential parts as that shown in Fig. 3, but for the most part is constructed of standard pipe fittings and couplings. The body of this modified holder is a standard Y-fitting 25 having a conductor head 27 similar to the head 7 screwed into the threaded stem port 30 thereof. The head, as in the preferred modification, has a conductor bar or piece 28 secured thereto with an Allen screw 29. In one branch port 31 in alignment with the stem port 30 is screwed a standard nipple 32 having a collar 33 pressed thereon and through which the cable 21 extends into the fitting 25 for attachment to the inner end of conductor head 27. In the other branch port 34 of the Y-fitting is screwed another standard nipple 35 to extend at an angle of approximately 45° to the longitudinal axis of the Y-fitting. A standard L fitting 24 or elbow is screwed on to the nipple 35, whereby another nipple 36 screwed into the other end thereof extends parallel to the longitudinal axis of the Y-fitting 25 and is spaced therefrom entirely free and clear of the cable 21. An insulated handle 23 of Bakelite or other suitable insulating material is press fitted on to the nipple 36. In this modified form of invention, the hollow handle 23 communicates with the interior of the body of the holder or Y-fitting 25 for ventilation and cooling created by natural convection of air flowing through the hollow parts and this may be augmented by drilling holes in the walls of the Y and L fittings.

In either modification, the electrode attachment bar 8 or 28 is disposed in the same plane as a plane including both the body and handle of the holder, so that when the holder is laid on a table top 40 with the bar 8 or 28 flat on the same, the handle 13 or 23 and the cable 11 or 21 lie flat on the table. The head 7 or 27 can be rotated or adjusted upon its axis to dispose the electrode bar in any angular relation with respect to the common plane of the handle and body, so as to dispose the handle in spaced relation to the table top and laterally of the body 5 or 25 as shown in Fig. 4 when the holder is laid on a table top with the bar 8 or 28 flat against the same. Thus, when the holder is laid on this table top in this manner, the handle thereof is spaced above the table to facilitate grasping the holder. Many different angular relations can be achieved by adjusting the bar 8 or 28 or the head 7 or 27 about their axes to vary the relationship of the handle 13 or 23 with respect to the plane or planes of said bars. Also, the conductor head or bar can be turned on the axis of the former to best suit the convenience of the operator in handling the weld rod in the position which best facilitates good welding.

It is to be understood that various changes in the size, relation and arrangement of parts may be resorted to without departing from the spirit of the invention or the scope of the appended claims.

I claim:

1. An electrode holder comprising a hollow body having an electrode fastening head to which an electric conductor cable is adapted to extend through said hollow body, and a hollow handle by which the holder is held by an operator in welding position and having an offset portion secured to said body to dispose said handle in completely spaced relation to said cable and to extend generally parallel to said body.

2. An electrode holder comprising a hollow body having an electrode fastening head to which an electric conductor cable is adapted to be attached, and a hollow handle having a hollow offset portion secured to said body at an obtuse angle to dispose said handle in completely spaced relation to said cable and to extend generally parallel to said body, said hollow offset portion being open ended and perforated for cooling purposes.

3. An electrode holder comprising a hollow body through which an electric conductor cable is adapted to extend, a hollow angular member secured to one side of said body and extending therefrom at an obtuse angle and having a portion substantially parallel with said body and extending beyond one end thereof, and an insulating handle secured to said parallel part of said member by which the holder is held by an operator in welding position and said handle being free of all electrical conductors.

4. An electrode holder comprising an angle pipe fitting having a tubular body with a tubular lateral branch between its ends extending at an angle thereto, a conductor head secured to said tubular body adapted to be connected with an electric conductor cable adapted to extend through said body, and a handle secured to said lateral branch free of contact with all electrical conductors.

5. An electrode holder comprising a Y pipe fitting having a tubular body with a tubular lateral branch between its ends extending at an angle of approximately 45 degrees thereto, a conductor head secured to said tubular body and adapted to be connected with an electric conductor cable adapted to extend through said tubular body, and a handle secured to said lateral branch to extend substantially parallel with said tubular body free of contact with all electrical conductors.

6. An electrode holder comprising a hollow body, an electrode attaching head rotatably mounted on said body on an axis transverse thereof, and a laterally offset handle secured to said body in the same plane thereof and having its gripping portion spaced from the body.

7. An electrode holder comprising a hollow body through which an electric conductor cable is adapted to pass, an electrode attaching head rotatably mounted on said body on an axis transverse thereof and adapted to be connected to said conductor cable, and a laterally offset handle secured to said body in the same plane thereof and spaced from the body, completely free and clear of said conductor cable.

8. An electrode holder comprising a Y pipe fitting having a pair of branches and a stem, an electrode attaching head secured to one end of the stem of said Y fitting and an electric cable extending into the other end of the stem through one of said branches and said stem for connection with said head, a nipple secured in the other of said branches and having an elbow, and a handle secured to said elbow to extend in spaced parallel relation to said stem of said fitting.

9. An electrode holder comprising a straight hollow body having an electrode fastening head, an electric conductor cable adapted to extend longitudinally through said hollow body to be attached to said head, a hollow elbow having one end extending at an obtuse angle rearwardly of the forward end of said body and having an open end secured to the intermediate portion thereof to dispose the rear open end of said elbow in completely spaced relation to said cable and in spaced parallel relation to said body, and an insulated open-ended tubular hand grip on said rear end of said elbow extending substantially parallel to and lengthwise beyond the end of said hollow body completely free of contact with said electric conductor cable.

WILLIAM E. SMITH.